(12) United States Patent
Larsson et al.

(10) Patent No.: US 9,581,066 B2
(45) Date of Patent: Feb. 28, 2017

(54) FUEL DISPENSING SYSTEM WITH HEATING METHOD

(71) Applicant: Wayne Fueling Systems LLC, Austin, TX (US)

(72) Inventors: Bengt I. Larsson, Malmo (SE); Harry Zimmermann, Einbeck (DE)

(73) Assignee: Wayne Fueling Systems LLC, Austin, TX (US)

(*) Notice: Subject to any disclaimer, the term of this patent is extended or adjusted under 35 U.S.C. 154(b) by 36 days.

(21) Appl. No.: 14/704,304

(22) Filed: May 5, 2015

(65) Prior Publication Data

US 2015/0233275 A1    Aug. 20, 2015

Related U.S. Application Data

(63) Continuation of application No. 13/743,151, filed on Jan. 16, 2013, now Pat. No. 9,057,308.

(51) Int. Cl.
  *B67D 7/16* (2010.01)
  *F01N 3/20* (2006.01)
  *F16L 53/00* (2006.01)

(52) U.S. Cl.
  CPC ........... *F01N 3/2066* (2013.01); *F01N 3/208* (2013.01); *F16L 53/008* (2013.01);
  (Continued)

(58) Field of Classification Search
  CPC  B67D 7/82; B67D 2007/748; B67D 2007/42; B67D 2007/00; B67D 2007/54; B67D 2007/0423; B67D 2007/0419; B60D 5/02; F16L 53/02; F16L 53/008; F01N 2610/02; F01N 2610/10; F01N 2610/1453;
  (Continued)

(56) References Cited

U.S. PATENT DOCUMENTS 996,281 A    6/1911  Browning
4,620,645 A  11/1986 Hale
(Continued)

FOREIGN PATENT DOCUMENTS

DE    202005010318 U1    9/2005
EP        1460031 A1    9/2004
(Continued)

OTHER PUBLICATIONS

PCT Search Report and Written Opinion issued Apr. 24, 2014 in connection with corresponding PCT Patent No. PCT/US2014/010959.

*Primary Examiner* — Lien Ngo
(74) *Attorney, Agent, or Firm* — Mintz Levin Cohn Ferris Glovsky and Popeo, P.C.

(57) ABSTRACT

Embodiments of a heating system maintains the temperature of a fuel additive (e.g., AUS32) at and/or above freezing temperature to avoid crystallization. The heating system can form a fluid circuit with one or more coaxially arranged sleeves disposed about hoses that transport the additives. The fluid circuit can also include a central compartment that encloses a flow meter. A fluid heater couples with the fluid circuit to provide heating fluid, e.g., to the central compartment. The heating fluid disperses throughout the heating compartment and into the sleeves, thereby direction heating fluid in thermal proximity to the hoses and other components that handle the fuel additive.

22 Claims, 10 Drawing Sheets

(52) U.S. Cl.
CPC ...... *F01N 2610/02* (2013.01); *F01N 2610/10* (2013.01); *F01N 2610/1453* (2013.01); *F01N 2610/1486* (2013.01)

(58) Field of Classification Search
CPC . F01N 2610/1486; F01N 3/2066; F01N 3/208
USPC .............. 222/71–73, 146.1–146.5, 592, 593; 137/599.3; 138/111–117, 32–35
See application file for complete search history.

(56) References Cited

U.S. PATENT DOCUMENTS

| | | | |
|---|---|---|---|
| 5,163,586 | A | 11/1992 | Zinsmeyer |
| 5,557,084 | A | 9/1996 | Myers et al. |
| 5,954,101 | A | 9/1999 | Drube et al. |
| 6,446,504 | B1 * | 9/2002 | Maginnis, Jr. ........ G01F 1/6847 73/202.5 |
| 8,733,590 | B2 * | 5/2014 | Bartlett .................... B67D 7/04 165/287 |
| 9,057,308 | B2 | 6/2015 | Larsson et al. |
| 2005/0056340 | A1 | 3/2005 | Walker et al. |
| 2005/0145294 | A1 | 7/2005 | Fink et al. |
| 2008/0302504 | A1 | 12/2008 | Handa |
| 2012/0024892 | A1 | 2/2012 | Bartlett et al. |
| 2012/0074120 | A1 | 3/2012 | Massold et al. |

FOREIGN PATENT DOCUMENTS

| | | |
|---|---|---|
| EP | 2075218 A1 | 7/2009 |
| FR | 2466001 A1 | 3/1981 |
| FR | 2756268 A1 | 5/1998 |
| WO | WO-2011/054400 A1 | 5/2011 |
| WO | WO-2012084721 A1 | 6/2012 |

* cited by examiner

FUEL DISPENSING SYSTEM WITH HEATING METHOD

The present application is a continuation of U.S. application Ser. No. 13/743,151, now U.S. Pat. No. 9,057,308, entitled "Fuel Dispensing System With Heating System" filed Jan. 16, 2013, which is hereby incorporated by reference in its entirety.

CROSS REFERENCED TO RELATED APPLICATIONS

This application is a continuation of U.S. patent application Ser. No. 13/743,151 filed on Jan. 16, 2013 and entitled "Fuel Dispensing System with Heating System," which is hereby incorporated by reference in its entirety.

BACKGROUND

The subject matter disclosed herein relates to fuel dispensing systems and, in particular, to heating systems for use in fuel dispensing systems to prevent fuel additives from crystallizing at low temperatures.

Vehicles that use diesel fuels emit large amounts of nitrogen oxides or, more generally, $NO_x$. These emissions are harmful to the environment. Thus, techniques are in place to reduce these emissions. Selective catalytic reduction (SCR) is one technique that converts the NOx into diatomic nitrogen ($N_2$) and water ($H_2O$). SCR utilizes a reductant and a catalyst. Examples of the reductant include anhydrous ammonia, aqueous ammonia, and urea. Various standards and/or government regulations establish the proper solutions for the reductant, which in one form includes an aqueous urea solution, commonly referred to as AUS32 and identified in North America as Diesel Exhaust Fluid and abroad as AdBlue®.

Service stations throughout the world use dispensing systems that store AUS32 to provide regular access for end users that operate diesel-powered vehicles. However, these dispensing systems often encounter problems inherent with the AUS32 fluid. One problem of primary concern is crystallization of the AUS32 fluid. This problem can result in crystal build-up through the components of the dispensing system. The build-up can lead to clogs and other blockages that effectively reduce flow of the AUS32 fluid and, eventually, require maintenance to restore operability of the dispensing system.

Crystallization can occur at low temperatures and, more specifically, at and/or below the freezing point of the AUS32 fluid. The AUS32 fluid will begin to crystallize at about −7° C., forming a slush, and begin to solidify at about −11° C. Unfortunately, many service stations that wish to provide the AUS32 fuel additive are found in locations where temperatures are consistently at or below these critical temperatures for extended periods of time.

Solutions are therefore necessary to prevent crystallization of the AUS32 fluid in these cold environments. One common solution utilizes a large, heated cabinet that encloses the components of the dispensing system. The heated cabinet can maintain the entire dispensing system, or most of the dispensing system, at temperatures that are above the critical temperatures for the AUS32 discussed above. However, use of the heated cabinet, and similar heated compartments, are often considerably larger and/or are sized to heat volumes that are much larger than necessary to maintain the temperature of the AUS32. These features can lead to higher costs of operation (e.g., for the heaters and structure), complicate the refilling process for the end user, and suffer from implementation issues. For example, during a re-filling process, the end user may need to open the cabinet to extract the nozzle and/or to complete the transaction. Once the re-filling process finishes, the end user must then replace the nozzle and close the cabinet. This process relies on the end user to properly close the cabinet door to reestablish the integrity of the cabinet. Unfortunately, situations where the cabinet is not sufficiently closed and/or the cabinet door is left ajar after the re-filling process is complete will defeat the operation of the heated cabinet and can result in freezing of the AUS32 fluid.

Other solutions utilize in-situ heating techniques to elevate and maintain the temperature of the AUS32 fluid. These techniques may utilize a wire, a coil, and/or other element that inserts into the hoses that carry the fuel additive. Energizing these elements injects heat directly into the AUS32 fluid. However, although effective because the elements are in close proximity to the AUS32 fluid, the elements can reduce flow and pressure of the fuel additive in the hoses. Moreover, to afford heating throughout all components that handle the AUS32, and are thus at risk of crystallization, the dispensing system is likely to require different in-situ heating techniques with special designs for the components, e.g., hoses, nozzles, etc. This requirement can add costs and complexity to the design.

Still other solutions attempt to maintain movement of the AUS32 fluid, e.g., when the dispensing system is not in use. These systems deploy intricate fluid systems that allow the AUS32 to circulate continuously, thereby preventing stagnate conditions that can allow crystallization to occur. However, circulating systems also require complicated structure to maintain proper circulation of the AUS32 fluid as well as to avoid leaks and other problems that can lead to effluent from the dispensing system.

SUMMARY

This disclosure describes improvements to heating systems that can prevent crystallization of fuel additives, e.g., AUS32. These improvements focus heating on the components that handle the fuel additive and, thus, avoids risks of clogging and blockage due to crystal build-up in these components. This proposed heating system, however, right-sizes the configuration of the heating system to these at-risk components, which can reduce costs associated with materials and power usage. As discussed more below, the proposed designs utilizes a closed and/or partially-closed compartment structure that insulates the fuel additive-handling components. These components include the hoses and pipes that transfer the fuel additive, as well as the nozzles and meters with geometries that often drive the size requirements of conventional heated cabinet designs. Examples of this compartment structure can form a fluid circuit that allows heating fluid (e.g., air) to pass in close proximity to components that handle the fuel additive. In other examples, the heating system can include a heating element that provides direct heating of the fuel additive.

BRIEF DESCRIPTION OF DRAWINGS

Reference is now made briefly to the accompanying Appendix, in which.

Where applicable like reference characters designate identical or corresponding components and units throughout the several views, which are not to scale unless otherwise indicated.

DETAILED DISCUSSION

Figure 1:
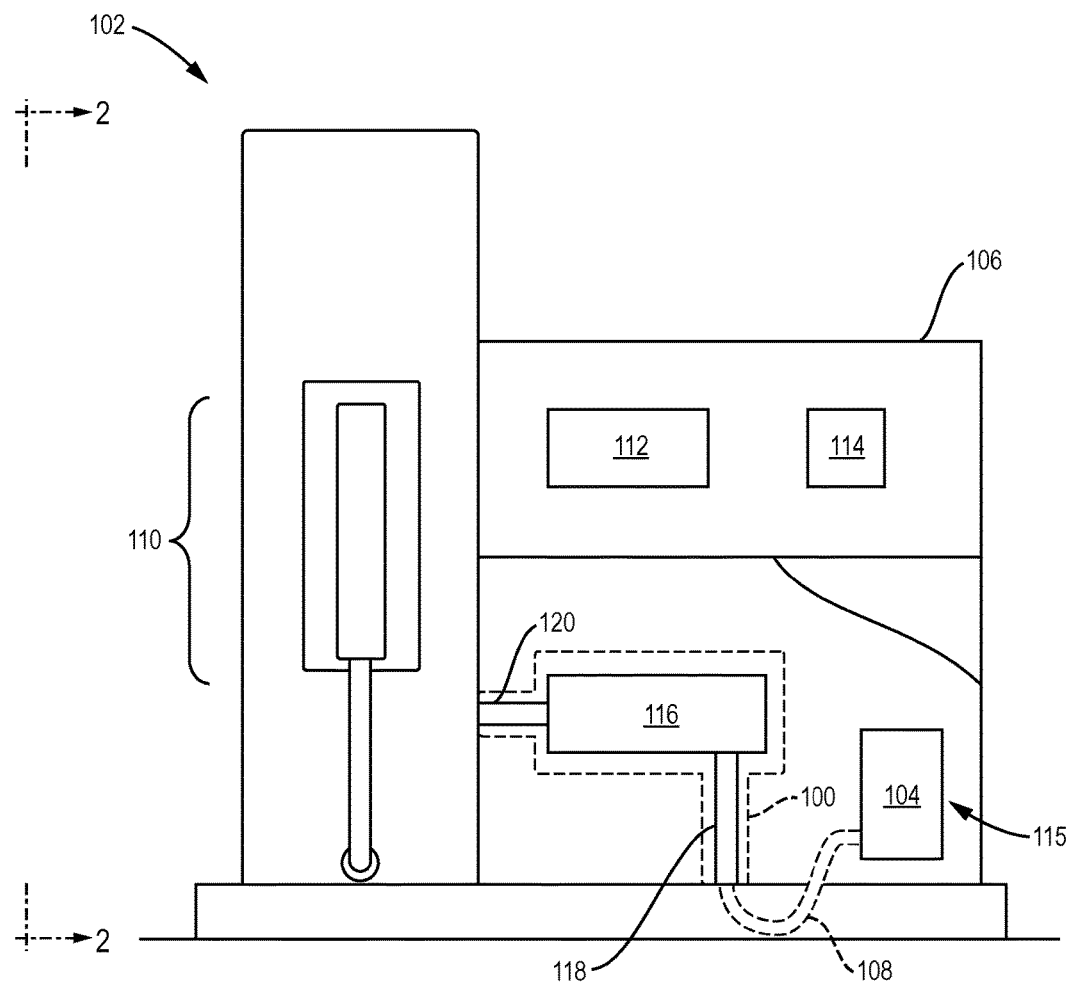
FIG. 1 depicts a schematic diagram of a partial cross-section of an exemplary embodiment of a heating system as part of a fuel dispensing system.

FIG. 1 depicts a schematic diagram to illustrate an exemplary embodiment of a heating system 100 of the present disclosure. The heating system 100 is part of a fluid dispensing system 102 (also "system 102") that includes a storage tank 104 and a dispenser unit 106. The dispensing system 102 also includes a hose 108 that places the dispenser unit 106 in flow connection with the storage tank 104. Examples of the dispensing system 102 can dispense fuel additives, e.g., Diesel Exhaust Fluid (DEF), urea resin, and similar fuel additives that reduce NOx emissions in diesel-powered vehicles.

As set forth more below, the heating system 100 manages the temperature of the fuel additive to avoid crystallization and/or solidification. This feature allows the dispensing system 102 to operate in cold environments with temperatures that fall below the freezing point of the fuel additives. Embodiments of the heating system 100, for example, can form a compartment structure that is sized and configured about the fuel additive-handling components of the dispenser unit 106. This component structure can insulate these components, thus helping to maintain the temperature of the fuel additive in cold environments.

In addition to the compartment structure, the heating system 100 can incorporate various heating schemes that elevate the temperature of the fuel additive. These heating schemes can circulate heating fluid in close proximity to the hoses, meters, nozzles, and other components of the dispenser unit 106 that handle the fuel additive. In other examples, the heating system 100 can inject thermal energy directly into the fuel additive, e.g., via one or more immersion heaters. These configurations maintain the temperature of the fuel additive at and/or above the freezing point, thus preventing crystals from forming (or "crystallization") in the fuel additive in these components. These crystals can clog the flow path of the fuel additive, which ultimately can disrupt operation of the dispenser unit 106. Moreover, solidification (or freezing) of the fuel additive solidify (or freeze) can rupture the hoses and other components of the dispenser unit 106. The resulting damage can bring the dispenser unit 106 offline for extended periods of time due to the extensive repairs necessary to replace the damaged components.

In FIG. 1, the dispenser unit 106 includes a nozzle assembly 110 and various control and operation elements (e.g., a display 112 and a payment device 114). The dispenser unit 106 also includes a compartment 115 with a flow meter 116, a fluid inlet 118, and a fluid outlet 120. The fluid inlet 118 and the fluid outlet 120 can comprise fluid-carrying components (e.g., hoses, pipes, couplings, and/or the like) that allow fluid flow therethrough. Examples of the fluid-carrying components are made of materials compatible with the fuel additive. In one example, the fluid inlet 118 couples with hose 108 to allow fuel additive to enter the dispenser unit 106. The fluid outlet 118 can extend from the flow meter 116 to the nozzle assembly 110 as a single unitary member (e.g., a hose) and/or in constructions that utilize multiple pieces (e.g., multiple hoses and fluid couplings disposed therebetween). Both single and multi-piece configurations of components place the nozzle assembly 110 in flow connection with the flow meter 116. During operation of the dispenser unit 106, the fuel additive flows from the storage tank 104 to the flow meter 116 via the fluid inlet 118, through the flow meter 116, and from the flow meter 116 to the nozzle assembly 110 via the fluid outlet 120. The fuel additive flows through the nozzle assembly 110 until the fuel additive dispenses, e.g., into a tank on a diesel-powered vehicle.

Figure 2:
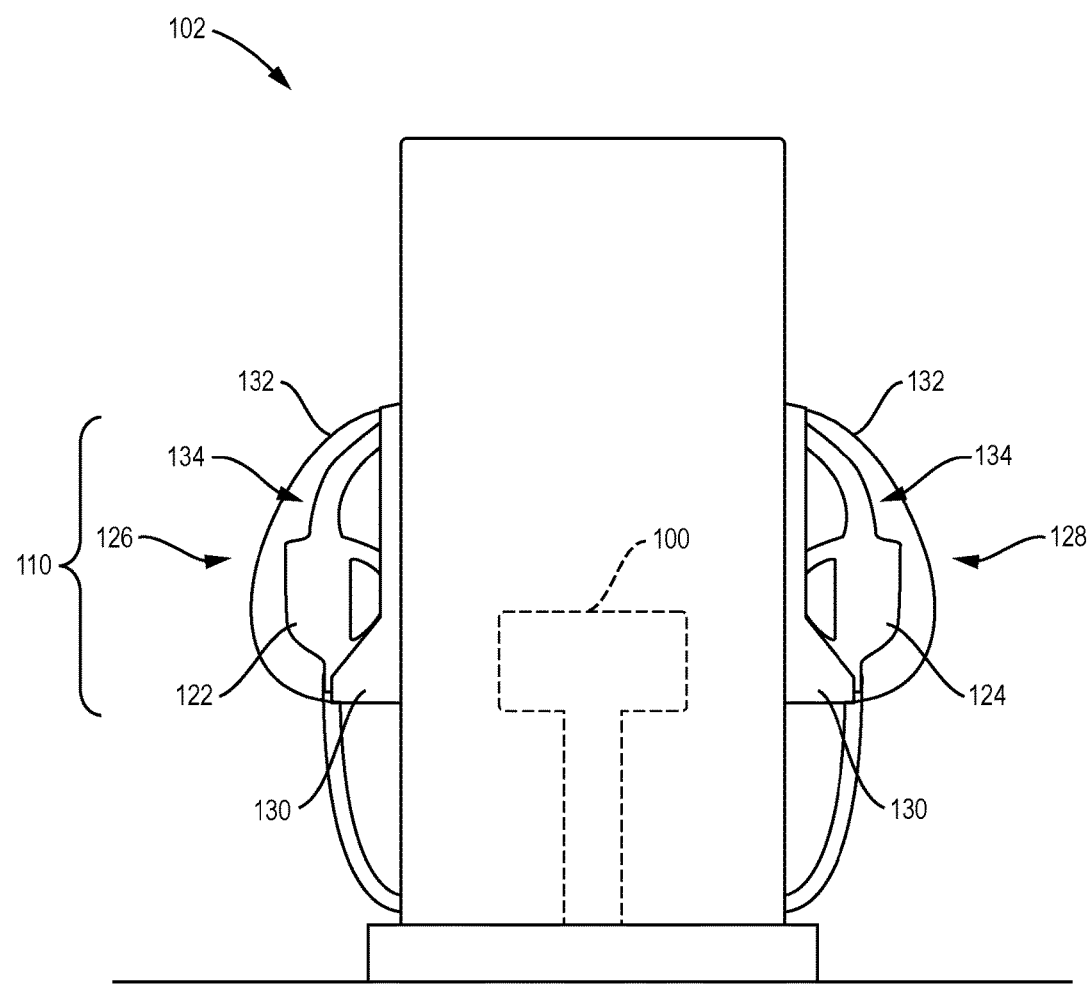
FIG. 2 depicts a side view of the fuel dispensing system of FIG. 1.

FIG. 2 illustrates a side view of the dispensing system 102, e.g., taken at line 2-2 of FIG. 1. As shown in the diagram of FIG. 2, the nozzle assembly 110 can include one or more nozzles (e.g., a first nozzle 122 and a second nozzle 124). The nozzle assembly 110 also has one or more cover system (e.g., a first cover system 126 and a second cover system 128) that house the nozzles 122, 124. The cover systems 126, 128 include a nozzle boot 130 and a cover 132 which surrounds the nozzles 122, 124 to provide a nozzle volume 134.

Construction of the cover systems 126, 128 permits the cover 132 to translate from a first position, shown in FIG. 1, to a second position that is different from the first position. The second position permits access to the nozzles 122, 124, e.g., to allow the end user to remove the nozzles 122, 124 from the nozzle boot 130 to dispense fuel additive. When the nozzles 122, 124 reside on the nozzle boot 130, e.g., when the nozzles 122, 124 are in the first position and the fuel dispenser 106 is not in use, the covers 132 cover the nozzles 122, 124 to form the nozzle volume 134.

In one embodiment, the heating system 100 can circulate heating fluid to the nozzle assembly 110. The heating fluid disperses into the nozzle volume 134, which elevates the temperature, e.g., of air, inside of the nozzle volume 134 proximate the nozzles 122, 124. This feature prevents crystallization of the fuel additive in the nozzles 122, 124, which often contains residual fuel additive that is left over between dispensing operations.

Figure 3:
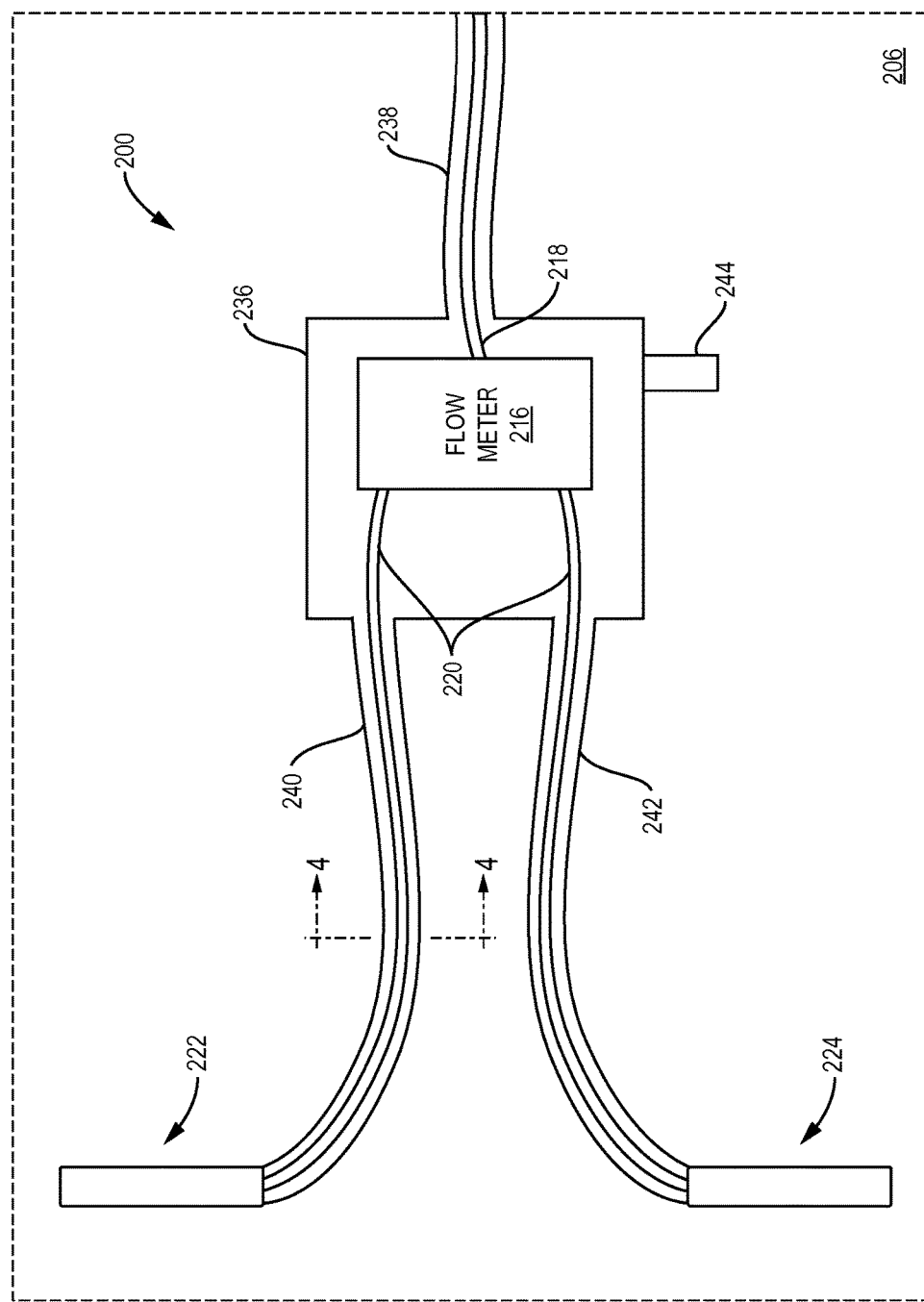
FIG. 3 depicts a schematic diagram of an exemplary embodiment of a heating system with a fluid circuit for circulating heating fluid.

FIG. 3 depicts a schematic diagram of an exemplary embodiment of a heating system 200 that can prevent crystallization of fuel additives. The heating system 200 forms a fluid circuit in the dispenser 206. The fluid circuit includes a central compartment 236 and one or more elongated sleeves (e.g., a first elongated sleeve 238, a second elongated sleeve 240, and a third elongated sleeve 242). The fluid circuit 235 can operate as a closed-loop and/or semi-closed loop system that carries heating fluid proximate components (e.g., the flow meter 216, the fuel inlet 218, and the fuel outlet 220) that handle the fuel additive. In one example, the heating system 200 includes a fluid heater 244, which is shown in flow connection with the central compartment 236.

Examples of the fluid heater 244 include devices that inject heating fluid into the fluid circuit at elevated temperatures. These devices may have a heating element and fluid moving element (e.g., a fan, a pump, etc.) that allow the fluid heater 244 to, respectively, heat and pressurize the heating fluid. Although shown in FIG. 3 as coupled with the central compartment 236, this disclosure further contemplates configurations for the heating system 200 in which the location of the fluid heater 244 is remote from the heating system 200. These configurations may require additional fluid-carrying components that couple the fluid heater 244 with heating system 200 and, in one example, a hose that places the fluid heater 244 in flow connection with the central compartment 236.

The central compartment 236 can form a sealed (and/or partially sealed) enclosure about the flow meter 216. This enclosure has properties that prevent thermal conduction of heat from the inside of the enclosure to the outside of the enclosure. For example, the enclosure can comprise insulation and other materials with relatively low thermal conductivity. These materials may form one or more walls of the enclosure and/or may find use as a liner that is disposed on an outer shell that forms the general structure of the central compartment 236.

The elongated sleeves 238, 240, 242 couple with the central compartment 236 to allow heating fluid to flow along the hoses and pipes of the fuel inlet 218 and the fuel outlet 220. This configuration disperses the heating fluid proximate the surface of the hoses and pipes to maintain the temperature along these components above the freezing point of the fuel additive. Devices for use as the elongated sleeves 238, 240, 242 fit about these hoses and pipes to form a coaxial fluid pathway to allow the heating fluid to pass between the outer surface of the hoses and pipes and the inner surface of the elongated sleeves 238, 240, 242.

Figure 4:
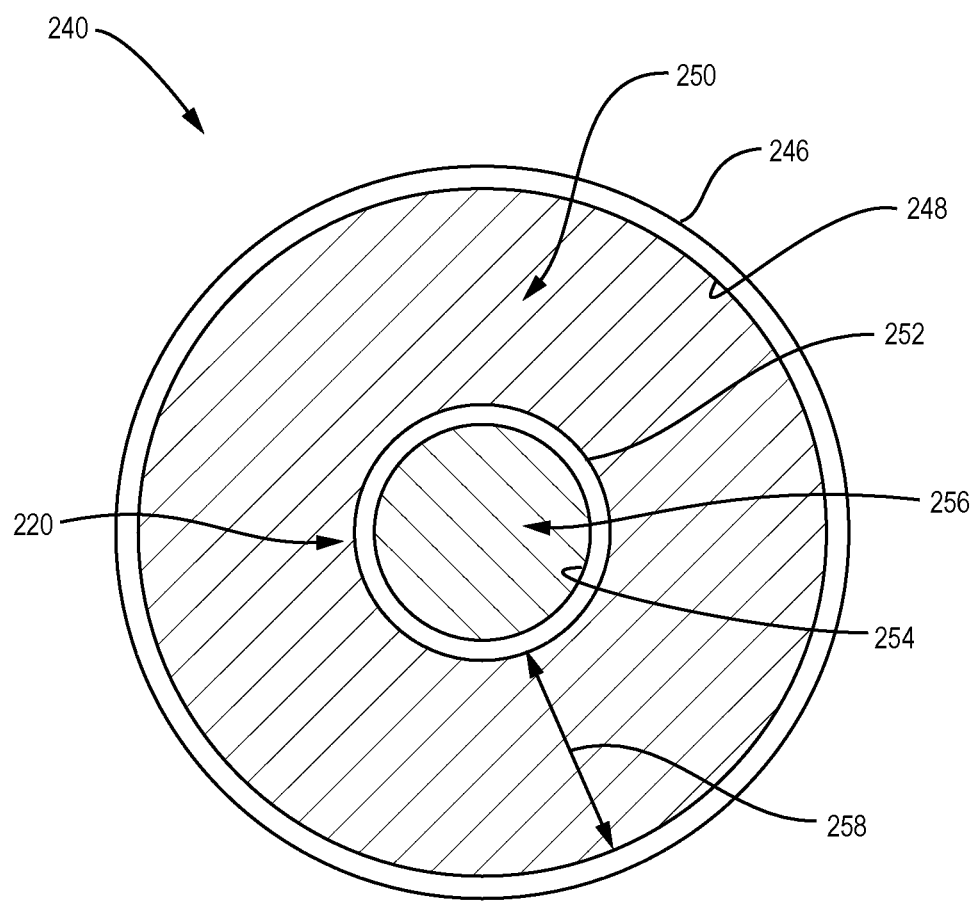
FIG. 4 depicts a cross section of the fluid circuit taken at line 4-4 of FIG. 3 to illustrate a coaxial configuration of components in the fluid circuit.

FIG. 4 depicts a cross-section view of the elongated sleeve 240 taken at the line 4-4 of FIG. 3 to illustrate an example of the coaxial fluid pathway. In FIG. 4, the elongated sleeve 240 has an outer sleeve surface 246 and an inner sleeve surface 248 that bounds a first flow area 250. The fluid inlet 220 includes a hose with an outer hose surface 252 and an inner hose surface 254 that bounds a second flow area 256. As shown in FIG. 4, the size of the hose is smaller is relative to the size of the elongated sleeve 240, thus forming a gap 258 between the inner sleeve surface 248 and the outer hose surface 254. When implemented as part of the heating system 200 (FIG. 3), heating fluid can flow in the gap 258 and along the outer hose surface 254. This feature allows thermal energy to transfer from the heating fluid to the outer hose surface 254. The transfer raises and/or maintains the temperature of the hose at and/or above the freezing point of the fuel additive.

Figure 5:
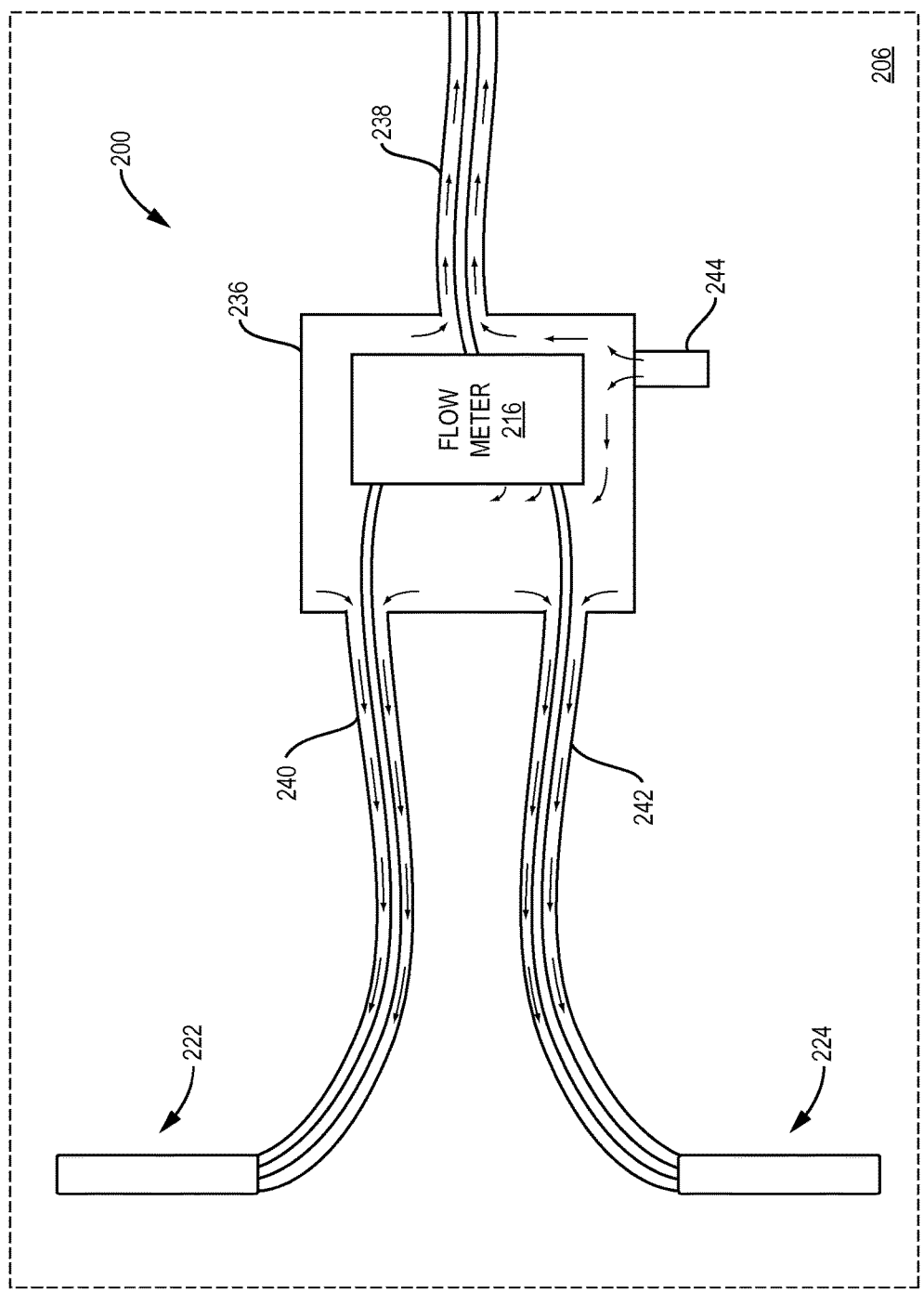
FIG. 5 depicts an exemplary flow pattern that results from operation of a fluid heater in the heating system of FIG. 3.

FIG. 5 illustrates an exemplary flow pattern for heating fluid that travels in the coaxial pathway of the heating system 200. This flow pattern shows the distribution of heating fluid from, e.g., the fluid heater 244, about the central compartment 236 and into the elongated sleeves 238, 240, 242. As shown in FIG. 5, the coaxial pathway can extend to the nozzles 222, 224 to allow heating fluid to flow along the entirety of the hoses that supply fuel additive to the nozzles 222, 224. Although not shown as part of the flow pattern, this disclosure contemplates configurations of the heating system 200 in which the flow pattern allows heating fluid to circulate, and/or re-circulate, about the fluid circuit of the proposed designs. To this end, the heating system 200 may utilize a pressure-release mechanism and/or slow leak configuration in one or more components of the heating system 200 to exhaust heating fluid from the fluid circuit. This feature prevents pressurization of the fluid circuit that would prevent movement of heating fluid, e.g., as shown in the flow pattern of FIG. 5.

Figure 6:
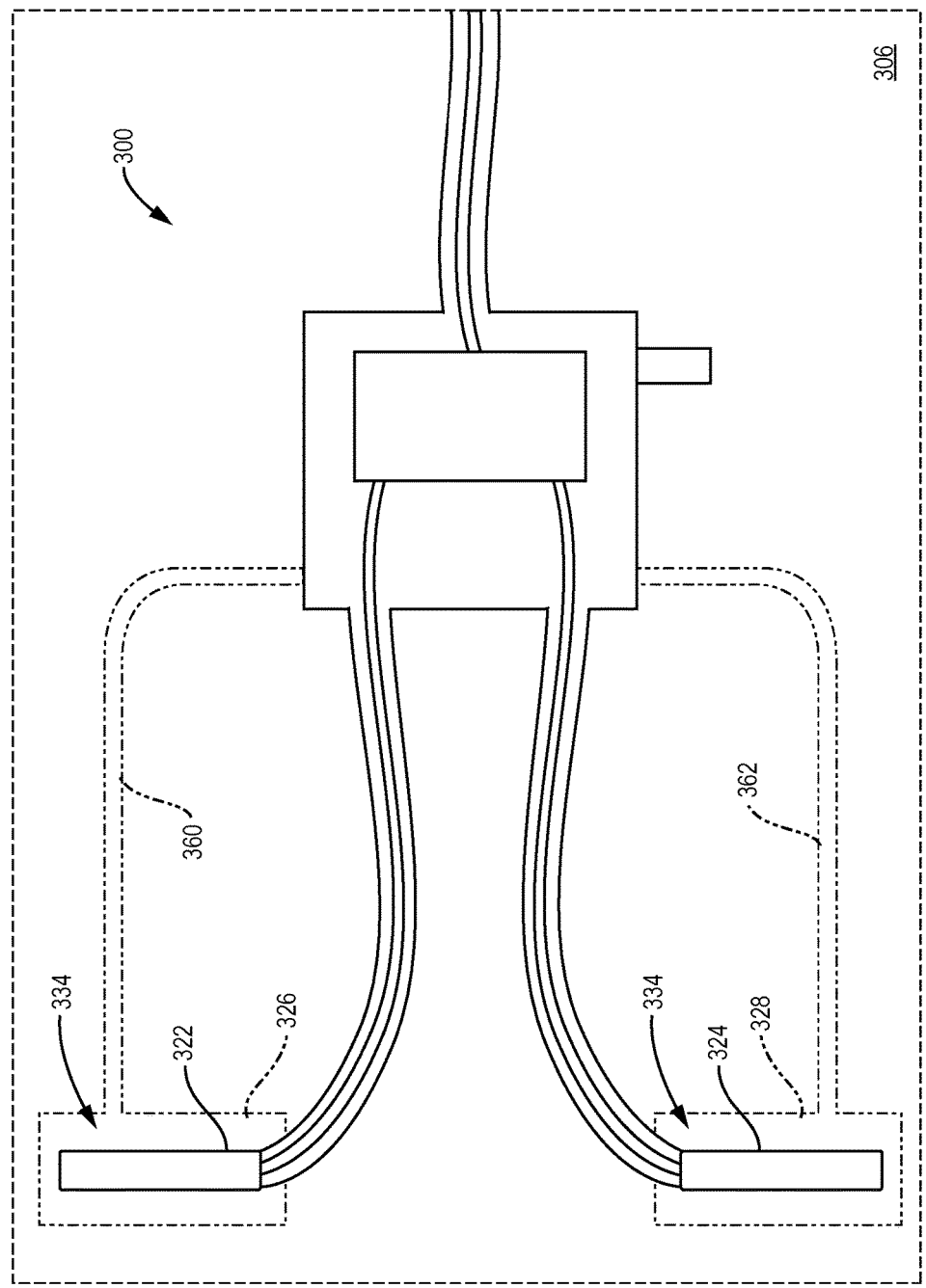
FIG. 6 depicts a schematic diagram of an exemplary embodiment of a heating system with a fluid circuit for circulating heating fluid to nozzles of the dispensing system.

FIG. 6 depicts a schematic diagram of an exemplary embodiment of a heating system 300 that illustrates one configuration to distribute heating fluid in the dispensing unit 306 and, in particular, into the nozzle volume 334 of the cover systems 326, 328. This configuration maintains the temperature of fuel additive that may reside in the nozzles 322, 324. In the example of FIG. 6, the heating system 300 includes one or more nozzle fluid paths (e.g., a first nozzle fluid path 360 and a second nozzle fluid path 362). The nozzle fluid paths 360, 362 couple with the fluid circuit, e.g., at the central compartment 326, and to nozzle volume (e.g., nozzle volume 134 of FIG. 2). This configuration exposes the nozzles to heating fluid that flows from the enclosure of the central compartment 326. In one example, one or more of the nozzle fluid paths 360, 362 couple with other parts of the fluid circuit, e.g., the elongated sleeves to provide the supply of heating fluid into the nozzle volume (e.g., nozzle volume 134 of FIG. 2).

Figure 7:
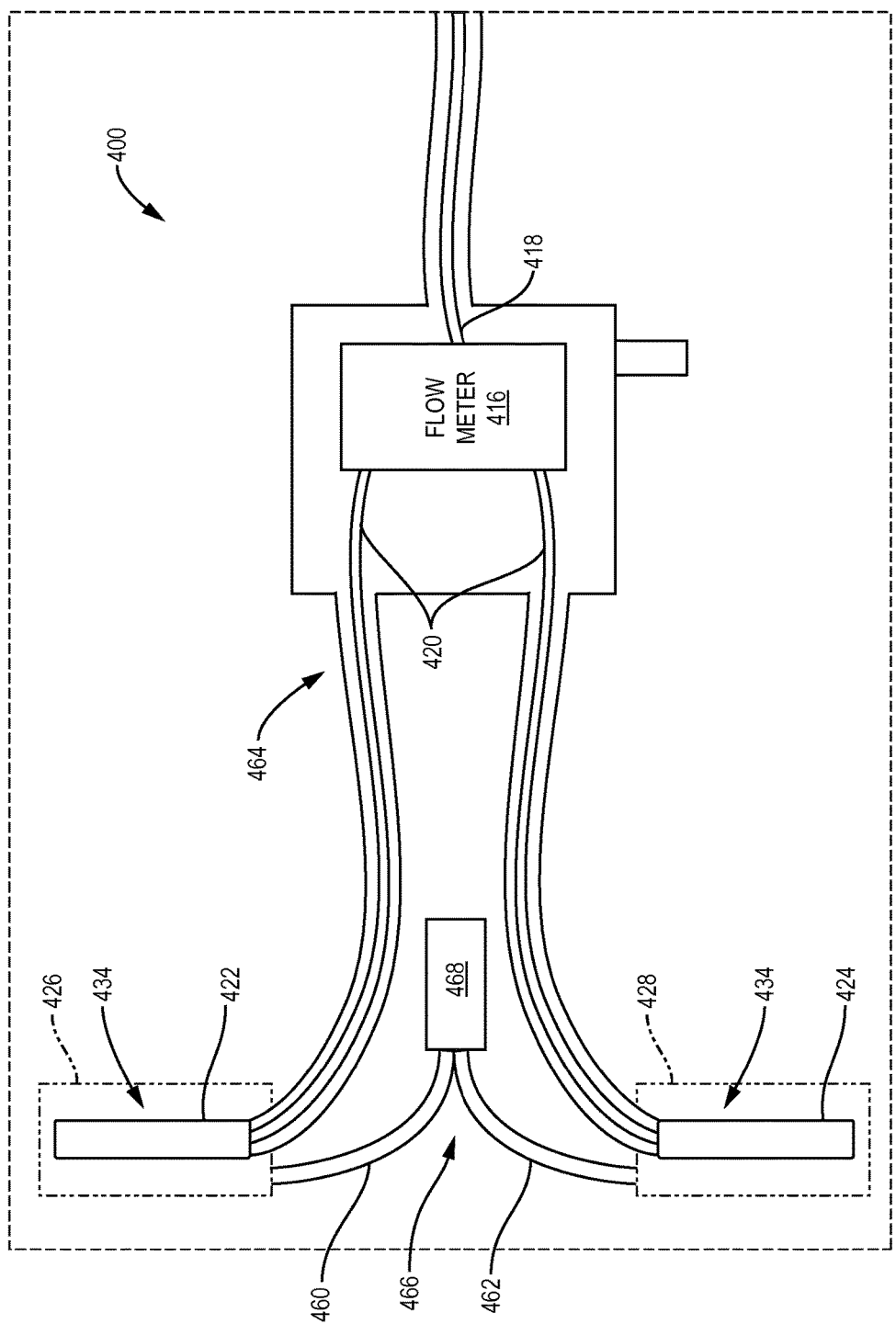
FIG. 7 depicts a schematic diagram of an exemplary embodiment of a heating system with a pair of fluid circuit for circulating heating fluid.

Turning next to FIG. 7, an exemplary embodiment of a heating system 400 can include one or more separate fluid circuits to distribute heating fluid about the components that handle the fuel additive. As FIG. 7 illustrates, the heating system 400 can include a first fluid circuit 464 and a second fluid circuit 466. The first fluid circuit 464, as set forth above, circulates heating fluid proximate the flow meter 416 and along the fluid inlet 418 and the fluid outlet 420. The second fluid circuit 466 can include the nozzle fluid paths 460, 462 and, in one example, a nozzle heater 468. In one implementation, the nozzle heater 468 includes one or more devices that inject heating fluid into the nozzle fluid paths 460, 462 to circulate into the nozzle volume 434 of the cover systems 426, 428 to maintain the temperature of fuel additive in the nozzles 422, 424.

Figure 8:
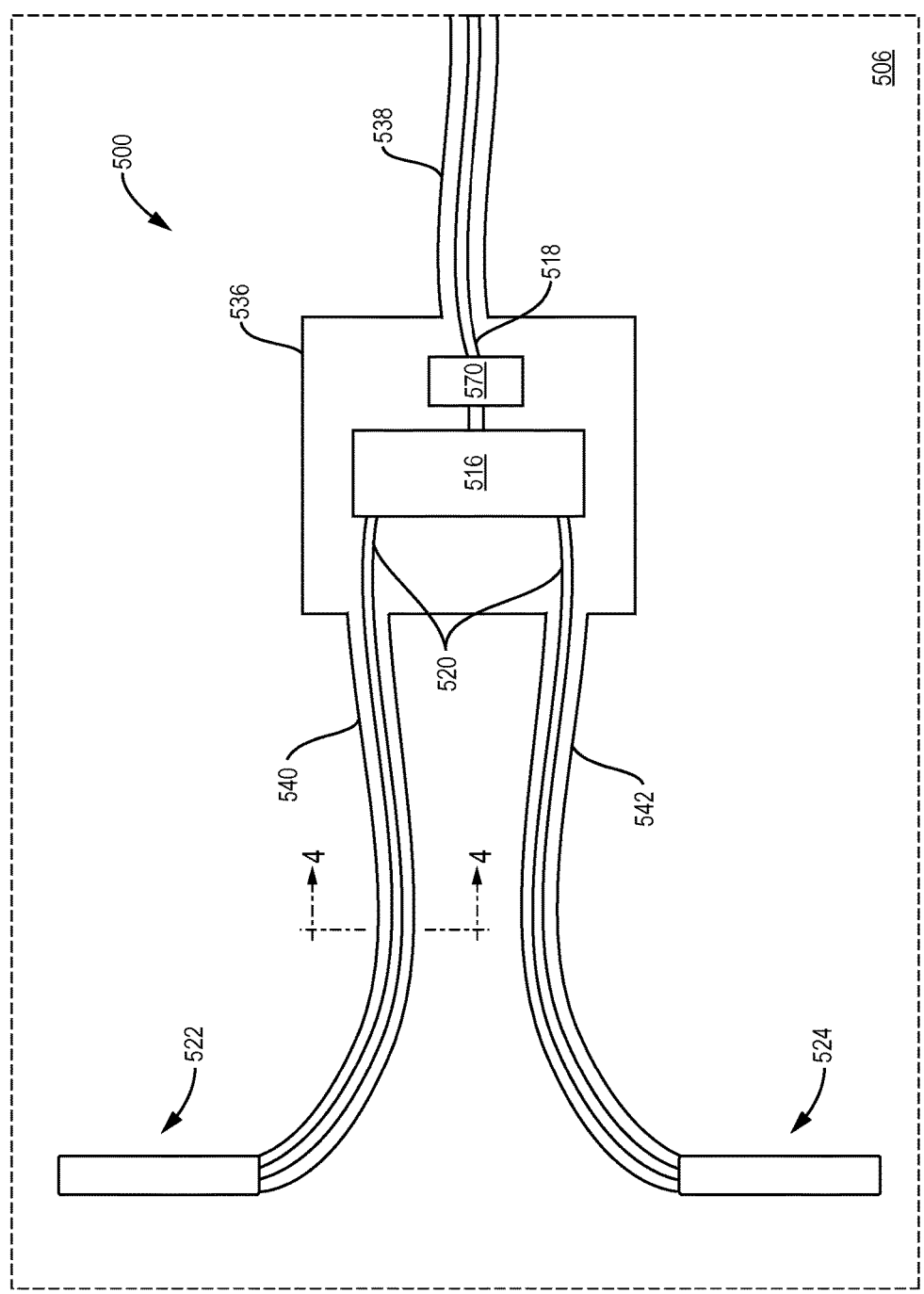
FIG. 8 depicts a schematic diagram of an exemplary embodiment of a heating system that incorporates a heating element to directly heat the fuel additive.
Figure 9:
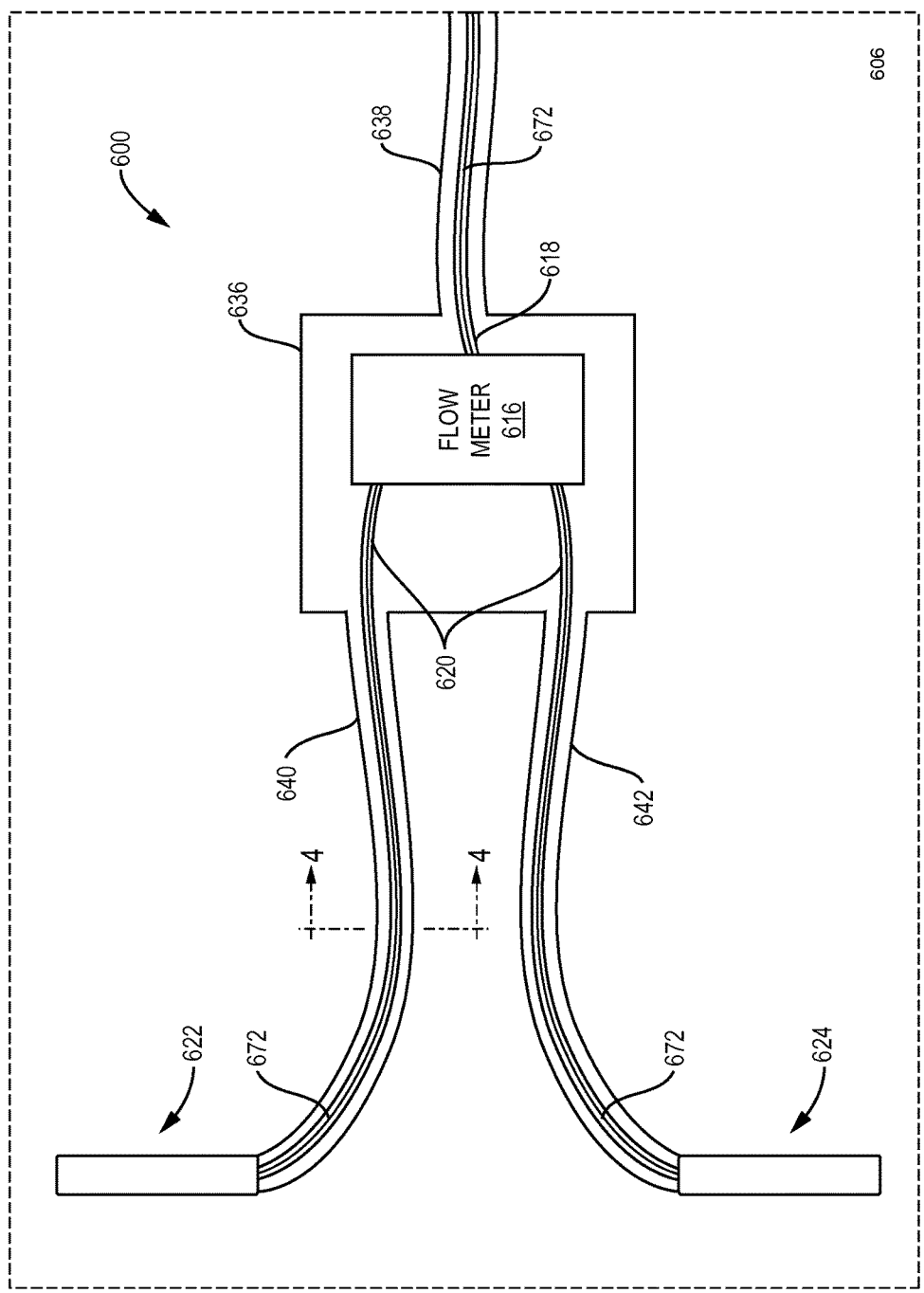
FIG. 9 depicts a schematic diagram of an exemplary embodiment of a heating system that incorporates one or more wires to directly heat the fuel additive.

FIGS. 8 and 9 illustrate configurations of heating systems that inject thermal energy directly into the fuel additive. The diagram of FIG. 8, for example, depicts an exemplary embodiment of a heating system 500 that includes a heating element 570 in the flow path of the fuel additive from the fuel inlet 518 to the flow meter 516. The heating system 600 of FIG. 9 includes another exemplary heating element in the form of an elongated wire and/or filament 672 that inserts into one or more of the fuel inlet 618 and the fuel outlets 620. Examples of the heating element 570 and the wires 672 can include devices that generate thermal energy to elevate the temperature of the fuel additive, e.g., as the fuel additive flows through the fuel dispenser 506. These devices may require an input, e.g., electrical signals having specified current and/or voltage to stimulate the thermal energy. In one example, the fuel dispenser 506, 606 is configured to circulate the fuel additive among the components (e.g., the flow meter 516, 616 the fuel inlet 518, 618 the fuel outlet 520, 620 and/or the nozzles 522, 622 and nozzles 524, 624). Circulation facilitates contact of the fuel additive with the heating element 570 and the wires 672 to maintain the elevated temperature of the fuel additive when the fuel dispenser 506, 606 is not in use to dispense the fuel additive.

Collectively, the central compartment (e.g., central compartment 536, 636) and the elongated sleeves (e.g., elongated sleeves 538, 540, 542 and elongated sleeves 638, 640, 642) can form a unitary and/or partially unitary chamber and/or compartment. This chamber insulates the components that carry the fuel additive. This configuration limits dissipation of heat energy from the fuel additive, thereby promoting effective heating and temperature maintenance of the fuel additive by the heating element 570 and the wires 672.

Furthermore, this disclosure contemplates combinations of one or more heating concepts to maintain and/or elevate the temperature of fuel additive. For example, the insulating chambers (as shown in FIGS. 8 and 9) can also operate as fluid circuits to allow heating fluid to traverse among the components of the dispenser. Such combinations of concepts may provide favorable temperature maintenance for particularly harsh, cold climates.

Figure 10:
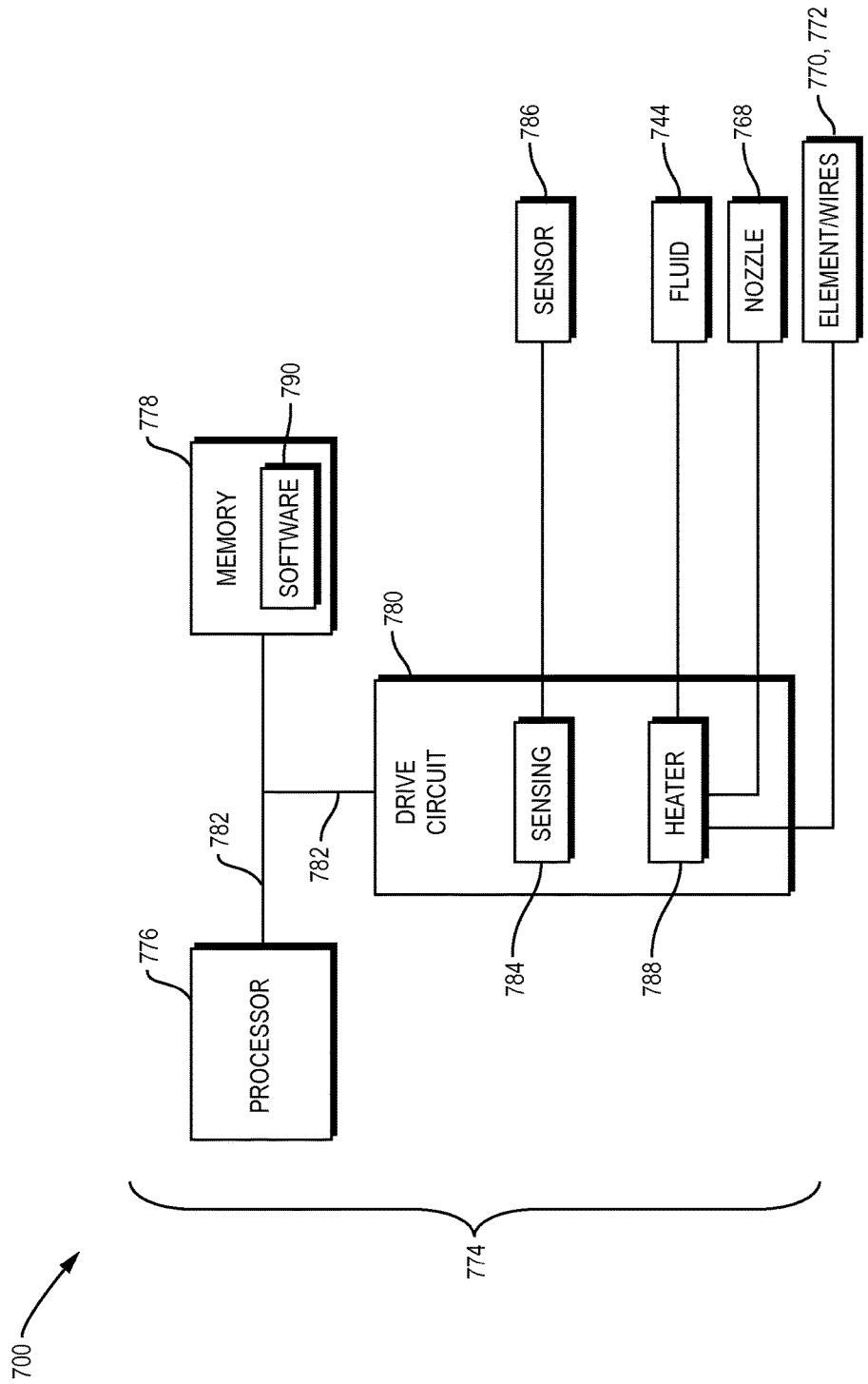
FIG. 10 depicts a schematic wiring diagram of an exemplary control device to maintain temperature in a heating system.

FIG. 10 depicts a schematic diagram that presents, at a high level, a wiring schematic for an embodiment of a heating system 700 that can maintain temperature inside of fuel dispensers above the freezing point of fuel additives. The heating system 700 includes a control device 774 with a processor 776, a memory 778, and control circuitry 780. Busses 782 couple the components of the control device 774 together to permit the exchange of signals, data, and information from one component to another in the heating system 700. In one example, the control circuitry 780 includes sensing circuitry 784 that couples with one or more sensing devices (e.g., a first sensing device 786). The control circuitry 780 can also include heater drive circuitry 788 that couples with one or more heaters (e.g., the fluid heater 744 and the nozzle heater 768). As also shown in FIG. 10, memory 778 can include one or more software programs 790 in the form of software and/or firmware, each of which can comprise one or more executable instructions configured to be executed by the processor 776.

In one implementation, this configuration of components can properly elevate the temperature within the heating system 700. For example, the control device 774 can receive signals from the sensing device 786 that contain and/or embed information about the temperature in and around the fluid circuit of the heating system 700 and/or of the fuel additive. The control device 774 can process these signals to generate an output that, in one example, includes instructions to operate one or more of the heaters (e.g., the fluid heater 744, the nozzle heater 768, the heating element 770, and/or wires 772). For example, these instructions may cause the fluid heater 744 to turn on to circulate heating fluid when the temperature fails to satisfy a threshold criteria (e.g., is less than a threshold minimum temperature). On the other hand, the instructions may also cause the fluid heater 744 to turn off to stop heating fluid from circulating, e.g., when the temperature satisfies the threshold criteria (e.g., is greater than the threshold minimum temperature). In this way, the control device 774 can manage both temperature of the components that the heating system 700 heats as well as power consumption of the heater device 744.

The control device 774 (and the other components of heating system 700) and its constructive components can communicate amongst themselves and/or with other circuits (and/or devices), which execute high-level logic functions, algorithms, as well as executable instructions (e.g., firmware instructions, software instructions, software programs, etc.). Exemplary circuits of this type include discrete elements such as resistors, transistors, diodes, switches, and capacitors. Examples of the processor 776 include microprocessors and other logic devices such as field programmable gate arrays ("FPGAs") and application specific integrated circuits ("ASICs"). Although all of the discrete elements, circuits, and devices function individually in a manner that is generally understood by those artisans that have ordinary skill in the electrical arts, it is their combination and integration into functional electrical groups and circuits that generally provide for the concepts that are disclosed and described herein.

The structure of the components in the control device 774 can permit certain determinations as to selected configurations and desired operating characteristics for the heating system 700. An end user can convey this information via a graphical user interface or the control device 774 can retrieve this information, e.g., from a central database and/or computer. In lieu of software and firmware, the control device 700 may instead utilize electrical circuits that can physically manifest the necessary logical operations and/or can replicate in physical form an algorithm, a comparative analysis, and/or a decisional logic tree, each of which operates to assign outputs and/or a value to outputs that correctly reflects one or more of the nature, content, and origin of the changes that occur and that are reflected by the signals the control device 774 receives, e.g., at the control circuitry 780.

In one embodiment, the processor 776 is a central processing unit (CPU) such as an ASIC and/or an FPGA that is configured to instruct and/or control operation of one or more devices. This processor can also include state machine circuitry or other suitable components capable of controlling operation of the components as described herein. The memory 778 includes volatile and non-volatile memory and can store executable instructions in the form of and/or including software (or firmware) instructions and configuration settings. Each of the control circuitry 780 can embody stand-alone devices such as solid-state devices. Examples of these devices can mount to substrates such as printed-circuit boards and semiconductors, which can accommodate various components including the processor 776, the memory 778, and other related circuitry to facilitate operation of the control device 774.

However, although FIG. 10 shows the processor 776, the memory 778, and the components of the control circuitry 780 as discrete circuitry and combinations of discrete components, this need not be the case. For example, one or more of these components can comprise a single integrated circuit (IC) or other component. As another example, the processor 776 can include internal program memory such as RAM and/or ROM. Similarly, any one or more of functions of these components can be distributed across additional components (e.g., multiple processors or other components).

As used herein, an element or function recited in the singular and proceeded with the word "a" or "an" should be understood as not excluding plural said elements or functions, unless such exclusion is explicitly recited. Furthermore, references to "one embodiment" of the claimed invention should not be interpreted as excluding the existence of additional embodiments that also incorporate the recited features.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method of heating for a fuel dispensing system, comprising:
    receiving at a flow meter surrounded by an enclosure a fuel additive from a storage tank, the fuel additive flowing from the flow meter to a hose extending coaxially through an entire longitudinal length of an elongated sleeve that extends from the enclosure to a nozzle, the nozzle being configured to dispense the fuel additive; and
    heating the fuel additive flowing in the hose.

2. The method of claim 1, wherein heating the fuel additive includes a fluid heater providing a heated fluid that flows through the elongated sleeve so as to provide a flow of the heated fluid coaxially around the flow of the fuel additive in the hose.

3. The method of claim 2, wherein the flow meter is disposed within a compartment forming the enclosure around the flow meter, the fluid heater provides the heated fluid into the enclosure, and the elongated sleeve is in fluidic communication with the enclosure so as to receive the heated fluid provided into the enclosure by the fluid heater.

4. The method of claim 3, wherein the hose is not in fluidic communication with the enclosure.

5. The method of claim 1, wherein heating the fuel additive includes a heating element generating thermal energy in a flow path of the fuel additive so as to directly heat the fuel additive.

6. The method of claim 5, further comprising providing to the heating element at least one of a current input and a voltage input that stimulates the thermal energy.

7. The method of claim 1, further comprising sensing a temperature; and
    controlling the heating of the fuel additive flowing in the hose based on the sensed temperature.

8. The method of claim 1, wherein the fuel additive includes a fuel additive that reduce NOx emissions in diesel-powered vehicles.

9. The method of claim 1, wherein the fuel additive includes one of diesel exhaust fluid (DEF) and urea resin.

10. A fuel dispensing system, comprising:
    a flow meter configured to receive a fuel additive for delivery to a nozzle configured to dispense the fuel additive;
    a heating element; and
    a coaxial fluid pathway that includes a hose extending coaxially through an elongated sleeve, the hose having an outer surface, the elongated sleeve having an inner surface, and a gap being defined between the outer surface of the hose and the inner surface of the elongated sleeve, the hose being configured to receive the fuel additive from the flow meter for flow through the hose and delivery to the nozzle, the heating element being configured to provide heat in the gap that heats the fuel additive in the hose.

11. The system of claim 10, wherein the heating element includes a fluid heater configured to provide a heated fluid, and the elongated sleeve is configured to receive the heated fluid from the fluid heater for flow through the elongated sleeve so as to provide a flow of the heated fluid in the gap coaxially around the flow of the fuel additive in the hose.

12. The system of claim 11, wherein the hose and the elongated sleeve are fluidically separate such that the fuel additive in the hose and the heated fluid in the elongated sleeve cannot mix.

13. The system of claim 11, further comprising a compartment forming an enclosure around the flow meter, the fluid heater being configured to provide the heated fluid into the enclosure, the elongated sleeve being in fluidic communication with the enclosure so as to be configured to receive the heated fluid provided into the enclosure by the fluid heater.

14. The system of claim 13, wherein the hose is not in fluidic communication with the enclosure.

15. The system of claim 13, wherein the enclosure is either partially sealed or fully sealed.

16. The system of claim 10, wherein the heating element is configured to generate thermal energy and is in a flow path of the fuel additive so as to directly heat the fuel additive.

17. The system of claim 16, wherein the heating element is configured to receive at least one of a current input and a voltage input that stimulates the thermal energy.

18. The system of claim 10, further comprising a sensor configured to sense a temperature; and
    a control device configured to control operation of the heating element based on the temperature sensed by the sensor.

19. The system of claim 10, wherein the fuel additive includes a fuel additive that reduces NOx emissions in diesel-powered vehicles.

20. The system of claim 10, wherein the fuel additive includes one of diesel exhaust fluid (DEF) and urea resin.

21. The system of claim 10, further comprising a compartment forming an enclosure around the flow meter, a first terminal end of the elongated sleeve being at the enclosure, a second terminal end of the elongated sleeve being at the nozzle, a first terminal end of the hose being at the flow meter, and a second terminal end of the hose being at the nozzle.

22. A fuel dispensing system, comprising:
    a flow meter configured to receive a fuel additive for delivery to a nozzle configured to dispense the fuel additive;
    a heating element;
    a coaxial fluid pathway that includes a hose extending coaxially through an elongated sleeve, the hose being configured to receive the fuel additive from the flow meter for flow through the hose and delivery to the nozzle, the heating element being configured to provide heat that heats the fuel additive in the hose; and
    a compartment enclosing the flow meter, the heating element being configured to provide heated fluid into the compartment that flows therefrom into the elongated sleeve.

* * * * *